Sept. 3, 1968    A. D. RANDOLPH    3,399,976

PROCESS FOR PRODUCING BORAX DECAHYDRATE CRYSTALS

Filed July 24, 1967

ALAN D. RANDOLPH
INVENTOR.

BY *Wm. G. Addison*
ATTORNEY.

United States Patent Office 3,399,976
Patented Sept. 3, 1968

3,399,976
PROCESS FOR PRODUCING BORAX
DECAHYDRATE CRYSTALS
Alan D. Randolph, Gainesville, Fla., assignor to American
Potash & Chemical Corporation, Los Angeles, Calif.,
a corporation of Delaware
Continuation-in-part of application Ser. No. 438,840,
Mar. 11, 1965. This application July 24, 1967, Ser.
No. 669,633
5 Claims. (Cl. 23—301)

ABSTRACT OF THE DISCLOSURE

A process for controlling the mean size and size range of borax decahydrate crystals produced from a magma containing solid phase borax and water saturated with borax. The temperature and solids concentration of the magma are controlled to produce two basic crystal size distributions, one having a mean particle size of less than about 45 mesh and the other having a mean particle size of greater than about 45 mesh. Borax crystals of the smaller particle size are crystallized from the magma when the magma is maintained at a temperature of less than 115° F. and a solids concentration of greater than 0.25 gram of solid borax crystals per cubic centimeter of solids-free mother liquor. Borax crystals of the larger particle size are crystallized from the magma when it is maintained at a temperature higher than 115° F. and a solids concentration of less than 0.25 gram per cubic centimeter.

---

This application is a continuation-in-part of copending application Ser. No. 438,840, filed Mar. 11, 1965, now abandoned.

BACKGROUND OF THE INVENTION (1) Field of the invention

This invention relates to a process for the production of inorganic salts. More particularly, it relates to the production of borax decahydrate crystals of a controlled mean particle size and size range.

(2) Description of the prior art

It is well known that borax decahydrate ($Na_2B_4O_7 \cdot 10H_2O$) 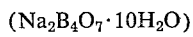

may be produced in a commercial operation by continuous crystallization of the borax from aqueous liquors. However, borax crystals produced by such continuous crystallization techniques are of uncontrolled mean size and size distribution. Consequently if it is desired to obtain borax crystals of a predetermined mean size and size range by these techniques, it is presently necessary to classify and/or screen the product. However, even when such procedures are used, generally only a small percentage of the total product is of the desired size range. As a result, production of borax crystals of a desired size by such prior techniques is a relatively inefficient operation.

SUMMARY OF THE INVENTION

The present invention provides a process for controlling the mean size and size range of borax decahydrate crystals produced by crystallization from an aqueous liquor.

Broadly, the present process provides for the control of certain critical conditions during the crystallization of borax decahydrate whereby crystals having a predetermined mean size and size range are obtained. Thus, it has been discovered that the mean particle size and size range of borax crystals, crystallized from an aqueous magma containing aqueous mother liquor and solid borax, may be controlled by controlling the temperature and solids concentration of the magma. By the use of suitable size classifying procedures in the removal of the product from the magma, a further advantage is achieved in that the predetermined size range of the borax crystals may be limited to a value close to that of the desired mean crystal size.

Advantageously, the process of this invention can be operated with the magma at such a slight degree of supersaturation that the apparatus generally does not become fouled with deposits of tightly adhering borax crystals. Generally the magma is supersaturated with less than about 2 percent of borax by weight of the solution.

DESCRIPTION OF THE DRAWING

The present invention and the advantages thereof will be more clearly understood from the following description and the drawing in which.

DESCRIPTION OF THE EMBODIMENTS

Figure 1:
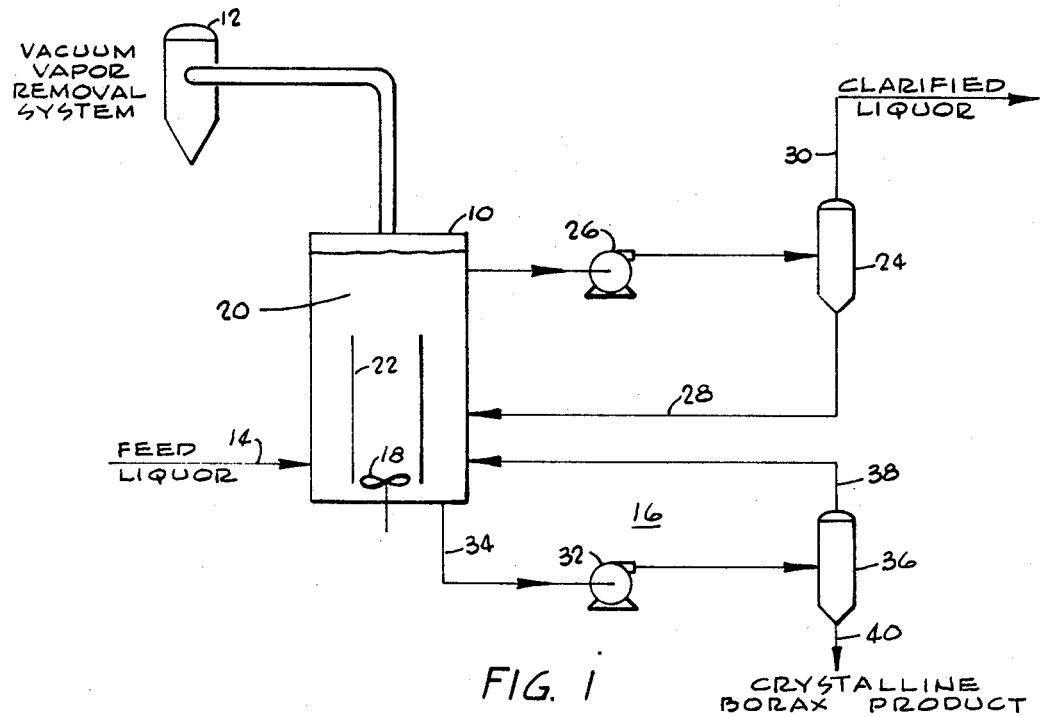
FIGURE 1 is a schematic illustration of one form of apparatus for use in practicing a preferred embodiment of the novel process of this invention.

It has been discovered that the nucleation rate of borax decahydrate crystallized from an aqueous magma is independent of supersaturation but is proportional to the solids concentration of the aqueous magma and inversely proportional to the temperature of the magma. Thus, the nucleation rate of borax is increased markedly at low temperatures and high solids concentration. Therefore, the temperature and solids concentration of the magma can be controlled to control the size distribution of the borax crystals and produce, as desired, borax crystals of two basic crystal size distributions. By the use of suitable size classifying procedures in the removal of the product from the magma the size range of the borax crystals may be restricted to that of a predetermined mean crystal size.

According to this invention, borax decahydrate crystals having a relatively small mean particle size, that is smaller than about 45 mesh (U.S. Standard), are produced when the magma is maintained at a relatively low temperature and high solids concentration; while borax crystals having a relatively large mean particle size, that is larger than about 45 mesh (U.S. Standard) are produced when the aqueous magma is maintained at a relatively high temperature and low solids concentration during the crystallization of borax therefrom.

Generally, solid phase borax decahydrate may be crystallized from an aqueous magma at temperatures between about 30° F. and 130° F. While temperatures slightly above about 130° F. may be used, particularly when the magma contains few impurities, such higher temperatures are usually not preferred for sodium tetraborate pentahydrate crystals ($NaB_4O_7 \cdot 5H_2O$) tend to form when the magma is maintained at temperatures much in excess of about 130° F. Generally, commercial borax crystallization operations are carried out between about 80° F. and 130° F.

In order to produce borax crystals having a mean particle size of smaller than about 45 mesh, the temperature of the magma is maintained below 115° F. and preferably between about 80° F. and 110° F., while borax crystals having a mean particle size of larger than about 45 mesh are obtained when the magma is maintained at a temperature of above 115° F., and preferably between about 120° F. and 130° F.

As noted hereinabove, it is also necessary to control the solids concentration of the magma, that is, the weight of solid borax contained in a given volume of mother liquor, in order to control the mean particle size of the borax crystals, for the effect of solids concentration the nucleation rate of borax from the magma is very pronounced. In general, an increase in the solids concentration of the magma results in a decrease of the mean particle size of the crystalline borax product. Thus, in order to produce borax having a relatively large particle size the solids concentration of the magma is maintained below 0.25 gram of solid borax crystals per cubic centimeter of solids-free mother liquor, while borax crystals having a relatively small mean particle size are obtained when the magma has a solids concentration of more than 0.25 gram of solid borax crystals per cubic centimeter of solids-free mother liquor. Preferably, the solids concentration is maintained between 0.05 and 0.25 gram per cubic centimeter to obtain the larger crystal sizes and between 0.25 and 0.50 gram per cubic centimeter to obtain the smaller crystal sizes.

The solids concentration of the magma may be controlled by the use of any conventional means adapted to separate the magma into its component liquid and solid phases. Similarly, any conventional means may be used to control the temperature of the magma. Thus, the temperature may be controlled by evaporative cooling under vacuum, external circulation through a heat exchanger, by introducing heat transfer means into the crystallizer itself, and the like. Generally, it is preferred to use the process and apparatus schematically illustrated in the drawing in order to control the conditions under which borax decahydrate crystals are produced.

Referring now to the drawing, reference numeral 10 refers to a crystallizer vessel of suitable design. Crystallizer 10 is provided with suitable heat regulating means, such as the vacuum vapor removal system 12 which is adapted to maintain crystallizer 10 at the desired operating temperature. A conduit 14 opens into the crystallizer 10 near the bottom thereof and is adapted to carry feed liquor to said crystallizer. A product removal and classification system 16 is provided at the bottom of crystallizer 10 to remove the borax crystal product from the crystallizer. An agitating or stirring means 18 driven by suitable power means (not shown) is positioned within crystallizer 10 to continuously agitate the magma 20. In operation, agitating means 18 and baffles 22 co-operate in their action to insure that the conditions of temperature and solids concentration are maintained at substantially uniform values throughout the entire body of magma.

The solids concentration in the magma, that is, the weight of solid phase borax contained in a given volume of mother liquor, may be adjusted by the use of any conventional means adapted to separate the magma into its component liquid and solid phases. Referring to FIGURE 1, one suitable means for separating the solid and liquid phases of the magma is a classifying device 24. Equivalent devices for separating liquid and solid phases, which may also be used, include for example, hydrocyclones, filters, centrifuges, settlers and the like.

In adjusting the solids concentration, magma is removed from the crystallizer by suitable means, such as pump 26. The solid phase portion of the magma together with a predetermined amount of mother liquor is returned to the crystallizer through a conduit 17 while a predetermined portion of the liquid phase is removed from the system through a conduit 30.

The product removal and classification system 16 shown in FIGURE 1 is composed of pump 32 which draws magma from crystallizer 10 through conduit 34 and discharges it into a classification device 36. Classification device 36 separates the magma into two streams; the first being a recycle stream containing mother liquor and undersized borax crystals, which is returned to crystallizer 10 through conduit 38, and the second being a product discharge stream containing crystals and some mother liquor, which is discharged through conduit 40. Classification device 36 narrows the particle size range of the product of predetermined values by separating the undersized crystals from those of the desired size range. The undersized crystals are returned to crystallizer 10, and the product crystals are removed from the system.

Figure 2:
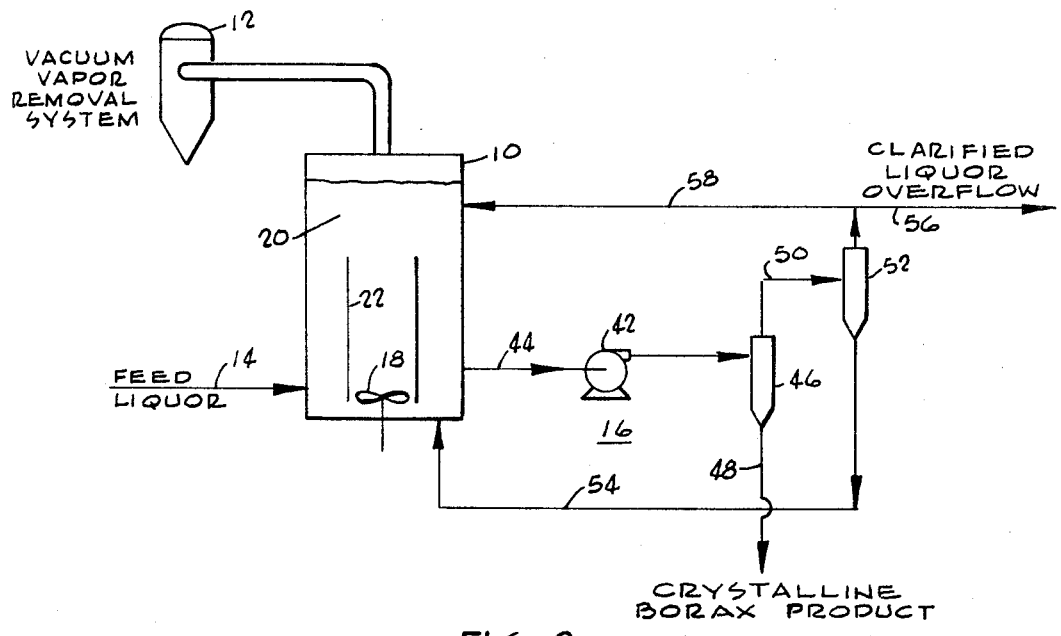
FIGURE 2 is a schematic illustration of another form of apparatus for practicing another preferred embodiment of the invention.

In FIGURE 2 the product removal and classification system is combined with the apparatus used to maintain the solids concentration in the magma. In this combined operation pump 42 draws magma from crystallizer 10 through conduit 44 and discharges the magma into classification device 46. Classification device 46 serves a function similar to that performed by classification device 36 in FIGURE 1. A slurry containing the desired predetermined size range of crystalline borax product in mother liquor is withdrawn through conduit 48.

A partially clarified slurry containing undersized borax crystals in mother liquor is conveyed to classification device 52 through conduit 50. Classification device 52 serves a function similar to that served by classifying device 24 in FIGURE 1. The operation of classifying device 52 is adjusted so that the solid phase portion of the slurry, together with a predetermined amount of mother liquor, is returned to crystallizer 10 through conduit 54 while a predetermined portion of the liquid phase is removed from the system by conduit 56. If desired, a portion of the liquid phase may also be returned to the crystallizer via conduit 58.

By properly proportioning the amount of clarified mother liquor which is removed from the system through conduits 30 or 56, with respect to the amount of borax crystals removed as product through conduits 40 or 48, it is possible to precisely, easily, and continuously adjust and maintain the solids concentration in magma 20 at any desired predetermined value.

In general, the proportion of mother liquor removed from the system with the crystalline borax product via conduit 40 or 48 to the mother liquor removed from crystallizer 10 via conduit 34 or 44 is from about 1 to 1 to about 1 to 20, and preferably from about 1 to 1.5 to about 1 to 10.

Advantageously, the preferred form of apparatus illustrated in FIGURE 2 reduces the possibility of crystal breakage.

Small crystals are less susceptible to breakage than large crystals. In the form of apparatus illustrated in FIGURE 2, classification device 52 operates only on small crystals whereas classification device 24, FIGURE 1, operates on a mixture containing both large and small crystals.

Generally, the feed liquor supplied through conduit 14 is substantially saturated with respect to borax and is at a temperature considerably above that of magma 20. The process is operative with feed liquors containing other dissolved materials in addition to borax, provided such other materials do not precipitate during the process.

Preferably, in a continuous operation, supersaturated feed liquor is admixed with magma 20 so rapidly and in such a manner that the feed never has an opportunity to flash. Operating under these conditions, feed liquor is distributed uniformly throughout magma 20 before it has the opportunity to lose its supersaturation and precipitate borax crystals at localized points in the magma. This rapid mixing permits the operator to establish constant predetermined conditions throughout the entire body of magma 20, and to maintain these conditions continually without disruptive fluctuations. This continuous maintenance of predetermined conditions at constant values is necessary in the production of borax crystals of a predetermined mean particle size and size range.

Since the feed liquor to the crystallizer 10 generally carries with it more heat than is necessary to maintain the magma 20 at the desired predetermined temperature, it is generally necessary to cool magma 20. Such cooling can be accomplished by any desired means such as, for example, cooling coils immersed in magma 20, cooling jackets about the walls of the crystallizer 10, and the like. One convenient cooling means is illustrated in the drawing and comprises a vacuum vapor removal system 12. The process wherein a vacuum vapor removal system is used to cool a magma is commonly required in the performance of this process is identified as a "vacuum crystallizer."

In the instant specification, including the specific examples, and the appended claims, all parts and percentages are by weight unless otherwise indicated, and mesh sizes are U.S. Standard Sieve Series. The following examples are set forth to illustrate the invention, whereby those skilled in the art may understand better the manner in which the present invention can be carried into effect.

EXAMPLE I

This example is illustrative of the production of relatively small borax crystals from a magma having a high solids concentration. The magma is maintained at a relatively low temperature during the production of these small crystals. Equipment of the type illustrated in FIGURE 2 is used in carrying out this example.

A magma consisting of an aqueous admixture of borax crystals and water saturated with borax is introduced into the vacuum crystallizer 10. A vacuum is applied to the crystallizer vessel of such a magnitude that the magma is established at and maintained at a temperature of 100° F.

Feed liquor, saturated with borax at 170° F., is supplied to the vacuum crystallizer. A crystalline borax product slurry is withdrawn from the crystallizer. The solids concentration of the magma is maintained at about 0.35 gram of borax solids per cubic centimeter of solids-free mother liquor by removing a clarified stream of mother liquor from the system through conduit 56. A hydrocyclone is used as the classifying device 46. Hydrocyclone 46 is operated so that one part of mother liquor leaves with the product through conduit 48 for each four parts of mother liquor supplied to hydrocyclone 46 through conduit 44.

The continuously produced borax decahydrate crystal product has a particle size predominantly in the range of −50 +150 mesh, with a mean particle size of about 177 microns (80 mesh).

This example is repeated with the exception that the aqueous admixture in the crystallizer is maintained at 110° F. rather than 100° F., with the solids concentration being maintained at about 0.35 gram per cubic centimeter. The borax decahydrate crystals produced have a particle size of −30 +100 mesh and a mean particle size of about 300 microns (50 mesh).

This example is repeated again using a temperature of 80° F. and a solids concentration of 0.3 gram of borax solids per cubic centimeter of solids-free mother liquor. The borax crystals produced have a particle size of −60 +230 mesh and a mean particle size of about 150 microns (100 mesh).

EXAMPLE II

This example is illustrative of the production of large borax crystals from a magma having a relatively high temperature and a relatively low solids concentration. Equipment of the type schematically illustrated in FIGURE 1 is used in carrying out this example.

A feed liquor saturated with borax at about 170° F. is introduced into the vacuum crystallizer 10. The magma in the crystallizer is maintained at a temperature of about 120° F. The borax solids contained in the magma are maintained at a concentration of about 0.20 gram of borax solids per cubic centimeter of solids-free mother liquor by controlling the withdrawal rate of clarified liquor through conduit 30. The process is operated continuously and the crystalline borax decahydrate product is withdrawn as a classified slurry through conduit 40 from product classifier 36. Classifier 36 is operated with one part of liquor leaving it with the product in conduit 40 to each three parts of liquor in the slurry entering via conduit 34. The borax decahydrate product recovered has a particle size of about −12 +45 mesh and a mean particle size of about 500 microns (35 mesh).

Repetition of the example, maintaining the magma at about 125° F., instead of 120° F., results in a product having a larger mean particle size.

Example II is repeated with the exception that the solids concentration of the magma is maintained at 0.18 gram per cubic centimeter of solids-free mother liquor, with the temperature of the magma being maintained at 120° F. The crystalline borax decahydrate produced has a mean particle size of about 30 mesh. Repetition of Example II in which the magma has a solids concentration of 0.15 gram per cubic centimeter and a temperature of 120° F. provides a product having a mean particle size of about 20 mesh.

A borax product having a particle size of −10 +40 mesh and a mean particle size of about 700 microns (25 mesh) is produced when Example II is repeated at a temperature of about 130° F., instead of 120° F. However, a small amount of sodium tetraborate pentahydrate may also be produced at this temperature.

These examples clearly show that the mean size and size range of borax decahydrate crystals may be controlled by controlling the temperature and solids concentration of the magma from which the borax is crystallized. Thus, the examples show that borax crystals having a mean particle size larger than about 45 mesh is produced when the solids concentration of the magma is less than 0.25 gram per cubic centimeter and the temperature of the magma is above 115° F., and preferably between about 120° F. and 130° F.

The examples further show that borax decahydrate having a mean particle size smaller than about 45 mesh is produced when the magma is maintained at a solids concentration of greater than 0.25 gram per cubic centimeter and the temperature of the magma is below 115° F., and preferably between about 80° F. and 110° F.

The ability to produce borax crystals of any desired predetermined, mean particle size is particularly important where the desired particle size is either relatively large or relatively small. Often, either large or small borax crystals are desired for a particular use. Prior to the present invention, these extremes in particle size were difficult or impossible to achieve in continuous commercial operations.

The foregoing examples illustrate the advantages of this invention in producing easily and directly, crystals of a desired predetermined mean size and narrow size range. The ability to produce crystals having the desired predetermined mean size permits very efficient operation of a borax crystallization process with very little discard or recycle of undesirably sized crystals. Advantageously, the production of a variety of different mean particle sizes is accomplished conveniently without significant alterations to existing equipment, according to this invention.

Various modifiers may, if desired, be added to the magma to control the crystal habit of the borax crystals produced. Suitable crystal habit modifiers include soap and fatty acids as disclosed in U.S. Patent No. 1,792,863.

As will be understood by those skilled in the art, what has been described hereinabove are preferred embodiments of the invention. However, modifications, changes and substitutions can be made therein without departing from the scope and spirit of the appended claims.

What is claimed is:

1. In a process for recovering borax decahydrate crystals from an aqueous magma containing solid phase borax and water saturated with borax in a crystallization zone wherein an aqueous borax feed solution is introduced into said crystallization zone and borax decahydrate crystals are withdrawn from said zone, the improvement which comprises producing borax decahydrate crystals having a controlled mean particle size and size distribution by continuously maintaining the magma in said crystallization zone at a temperature in the range of between about 30° F. and 120° F., continuously maintaining the concentration of solid phase borax in said crystallization zone at a value between about 0.05 to about 0.50 gram per cubic centimeter of solids-free liquor, and continuously withdrawing borax decahydrate crystals from said crystallization zone, whereby borax crystals having a mean size smaller than 45 mesh are produced when said magma is maintained at a temperature of less than 115° F. and a solids concentration of more than 0.25 gram per cubic centimeter of solids-free liquor, and borax crystals having a mean size larger than 45 mesh are produced when said magma is maintained at a temperature of more than 115° F. and a solids concentration of less than 0.25 gram per cubic centimeter of solids-free liquor.

2. A process as defined in claim 1 in which borax decahydrate crystals having a mean particle size larger than about 45 mesh are produced by continuously maintaining the magma in said crystallization zone at a temperature within the range of from 120° F. to 130° F., continuously maintaining the concentration of solid phase borax in the magma in said crystallization zone at a value of from about 0.05 to about 0.25 gram per cubic centimeter of solids-free liquor, and continuously withdrawing and recovering from said crystallization zone a slurry of borax decahydrate crystals having a mean particle size larger than about 45 mesh while continuously recycling predetermined quantities of clarified liquor to said crystallization zone.

3. A process as defined in claim 2 in which the concentration of the magma is maintained at a value between 0.05 and 0.25 gram of borax solids per cubic centimeter of solids-free liquor by continuously withdrawing from said crystallization zone a slurry containing borax crystals in mother liquor, separating and recovering borax decahydrate crystals larger than about 45 mesh from said slurry, and recycling a predetermined portion of said mother liquor to said crystallization zone such that when admixed with said borax feed solution the concentration of said solids phase borax in said crystallization zone is maintained between 0.05 and 0.25 gram per cubic centimeter of solids-free mother liquor.

4. A process as defined in claim 1 in which borax decahydrate crystals having a mean particle size smaller than about 45 mesh are produced by continuously maintaining the magma in said crystallization zone at a temperature within the range of from 80° F. to 110° F., continuously maintaining the concentration of solid phase borax in the magma in said crystallization zone at a value of from about 0.25 to about 0.50 gram per cubic centimeter of solids-free liquor, and continuously withdrawing and recovering from said crystallization zone a slurry of borax decahydrate crystals having a mean particle size smaller than about 45 mesh while continuously recycling predetermined quantities of clarified liquor to said crystallization zone.

5. A process as defined in claim 4 in which the concentration of the magma is maintained at a value between 0.25 and 0.50 gram of borax solids per cubic centimeter of solids-free mother liquor by continuously withdrawing from said crystallization zone a slurry containing borax crystals in mother liquor, separating and recovering borax decahydrate crystals smaller than about 45 mesh from said slurry, and recycling a predetermined portion of said mother liquor to said crystallization zone such that when admixed with said borax feed solution the concentration of said solid phase borax in said crystallization zone is maintained between 0.25 and 0.50 gram per cubic centimeter of solids-free mother liquor.

No references cited.

NORMAN YUDKOFF, *Primary Examiner.*

G. P. HINES, *Assistant Examiner.*